(12) United States Patent
Smoot et al.

(10) Patent No.: US 8,775,394 B2
(45) Date of Patent: Jul. 8, 2014

(54) TRANSACTIONAL FAILOVER OF DATA SETS

(75) Inventors: Peter L. Smoot, San Jose, CA (US); Dave Kohr, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 411 days.

(21) Appl. No.: 12/209,166

(22) Filed: Sep. 11, 2008

(65) Prior Publication Data

US 2010/0064168 A1    Mar. 11, 2010

(51) Int. Cl.
G06F 7/00 (2006.01)
G06F 17/30 (2006.01)

(52) U.S. Cl.
USPC ............................................ 707/703; 707/674

(58) Field of Classification Search
USPC .................... 707/703, 999.202, 694
See application file for complete search history.

(56) References Cited

U.S. PATENT DOCUMENTS

| | | | |
|---|---|---|---|
| 6,101,328 A * | 8/2000 | Bakshi et al. ................. | 717/170 |
| 6,144,999 A | 11/2000 | Khalidi et al. | |
| 6,643,795 B1 | 11/2003 | Sicola et al. | |
| 7,042,837 B1 * | 5/2006 | Cassiday et al. .............. | 370/225 |
| 7,111,194 B1 | 9/2006 | Schoenthal et al. | |
| 7,114,049 B2 | 9/2006 | Achiwa et al. | |
| 2002/0133735 A1 | 9/2002 | McKean et al. | |
| 2003/0188222 A1 * | 10/2003 | Abbondanzio et al. ......... | 714/12 |
| 2004/0010731 A1 * | 1/2004 | Yu et al. ............................ | 714/4 |
| 2004/0204949 A1 * | 10/2004 | Shaji et al. ........................ | 705/1 |
| 2005/0229021 A1 * | 10/2005 | Lubbers et al. ................... | 714/2 |
| 2006/0117212 A1 * | 6/2006 | Meyer et al. ..................... | 714/4 |

OTHER PUBLICATIONS

International Search Report PCT/US2009/066530 dated Apr. 20, 2010, pp. 1-4.
Written Opinion PCT/US2009/056630 dated Apr. 20, 2010, pp. 1-4.

* cited by examiner

Primary Examiner — Alexey Shmatov
(74) Attorney, Agent, or Firm — Perkins Coie LLP

(57) ABSTRACT

A network storage server implements a method to perform transactional failover of data sets. Multiple storage objects are organized into primary and secondary data sets, and a disaster recovery policy is configured for failing-over a primary data set to a secondary data set. A failover operation is defined for the disaster recovery policy. The failover operation includes multiple failover actions. During a failover situation, the failover operation is invoked to fail-over the primary data set. The failover operation is transactionally processed to ensure that all failover actions of the failover operation are performed in a single transaction.

22 Claims, 8 Drawing Sheets

TRANSACTIONAL FAILOVER OF DATA SETS

FIELD OF THE INVENTION

At least one embodiment of the present invention pertains to network storage systems, and more particularly, to a transactional failover of data sets in network storage systems.

BACKGROUND

A storage server is a computer system that is used to store and retrieve data on behalf of one or more clients on a network. A storage server operates on behalf of one or more clients to store and manage data in a set of mass storage devices, such as magnetic or optical storage-based disks or tapes. In conventional network storage systems, the mass storage devices may be organized into one or more groups of drives (e.g., redundant array of inexpensive drives (RAID)).

A storage server may be configured to service file-level requests from clients, as in the case of file servers used in a Network Attached Storage (NAS) environment. Alternatively, a storage server may be configured to service block-level requests from clients, as done by storage servers used in a Storage Area Network (SAN) environment. Further, some storage servers are capable of servicing both file-level and block-level requests, as done by certain storage servers made by NetApp®, Inc. of Sunnyvale, Calif.

A storage server typically provides various types of storage services to networked clients. One useful feature is the ability to back up or mirror a primary storage server to one or more secondary storage servers, so that data stored by the primary storage server is replicated to the secondary storage servers. When a system failure or a disaster prevents data access to the primary storage server, a secondary storage server not only helps to preserve data, but also may act as a substitute for the primary storage server, thus minimizing interruption to data requests.

However, switching data access from the primary storage server to the secondary storage server generally includes multiple actions. Each action must be performed successfully before the switching operation is deemed a success. When a disaster strikes and the actions are performed hastily by a user (e.g. a system administrator), it is often hard to ensure that each of the switching actions is properly and successfully executed. Without a proper mechanism to ensure this, a user may not be confident that all the necessary data are replicated, that the data sources are in a consistent and useful state before the switching operation, and that a business application will be able to resume operation after the switching operation.

To further complicate matters, some of the actions may fail to start, or result in error before completion. In a catastrophic situation, another user might inadvertently retry the failed actions without realizing its consequence. Or, multiple people might be trying to initiate the same switching operation at the same time. All of these scenarios can cause further confusion and delay in the recovery of the data.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
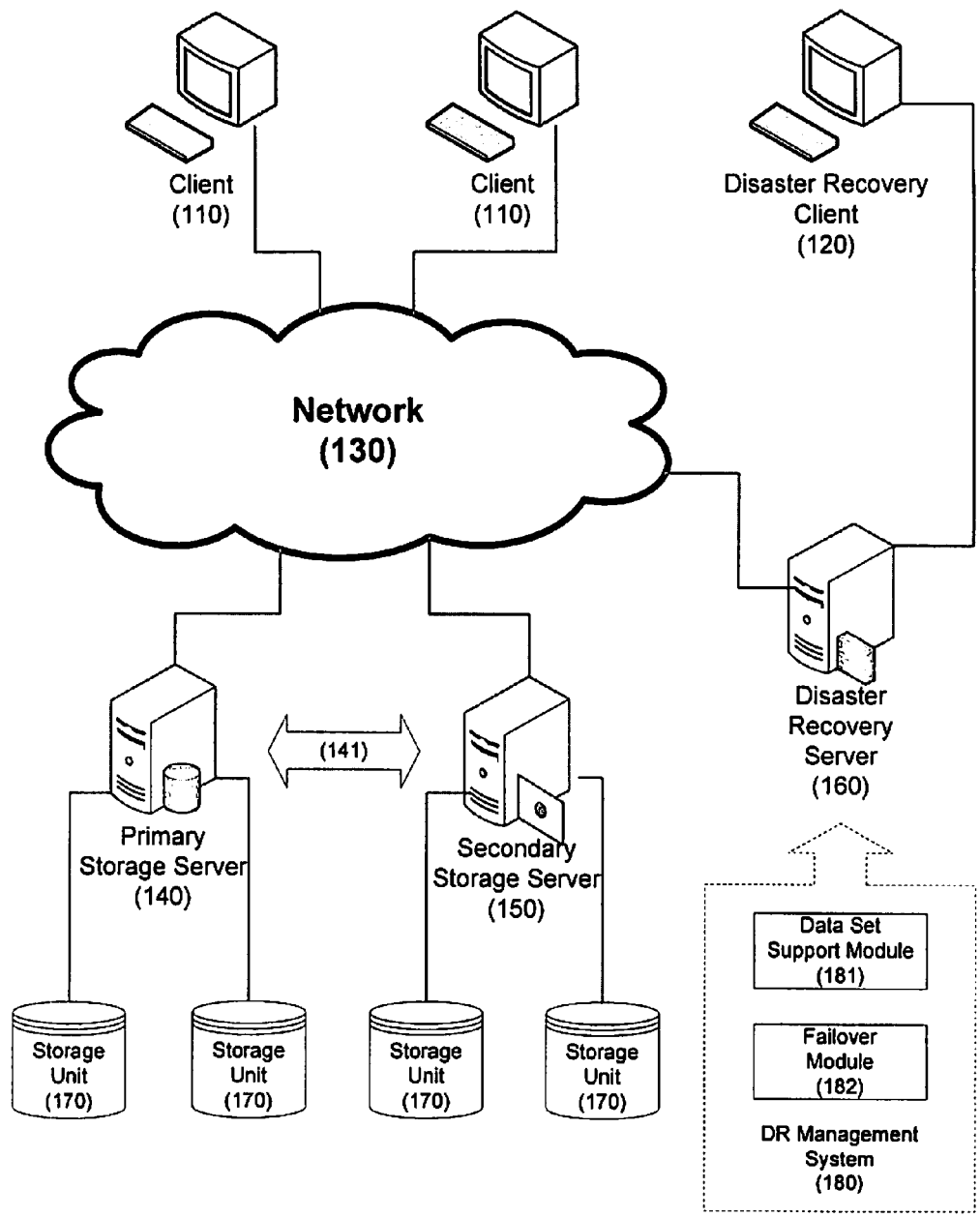
FIG. 1 illustrates a network storage system in which the present invention can be implemented.

A method and apparatus for providing transactional failover of data sets are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment, nor are they necessarily mutually exclusive.

Disaster Recovery (DR) refers to the planning, configuring and/or operating of storage resources such that data contained therein are preserved and remain available upon the occurrence of some unforeseen event. To maintain such capability, a fault tolerance configuration is established to include (1) a data redundancy setup; (2) a failover mechanism; and (3) a DR system to ensure the proper setup of the data redundancy and the proper operation of the failover mechanism. Data redundancy is implemented by organizing multiple data sources in a network storage environment into primary and secondary data sets, and replicating data from the primary data set to the secondary data sets. The failover mechanism is established by pre-arranging multiple actions into a comprehensive failover operation, which can be invoked to fail-over the primary data set to the secondary data set. A failover operation includes multiple actions (failover actions), each of which performs a step in failing-over the primary data set to the secondary data set. During disaster recovery, the DR system transactionally processes the failover operation, to ensure the successful completion of all actions of the failover operation as a whole (i.e., as an atomic operation). This transactionality maintains the integrity of the failover process if an error occurs, or if the failover operation is prematurely terminated.

A data set is defined to organize a set of storage objects into a logical unit, so that a management policy can be applied to the data set to uniformly configure and manage the set of storage objects. A storage object is a logical representation of a collection of data in a network storage environment. A storage object can represent, for example, a physical storage structure (e.g., a data block, a disk, a volume, etc), or a logical storage structure (e.g., a file, a directory, etc). For fault tolerance configuration, storage objects are organized into a primary data set and a secondary data set, for replicating data from the primary data set to the secondary data set.

After the data sets are created a management policy for disaster recovery (DR policy) can be applied to the primary data set for the configuration and management of a failover operation. A failover operation includes multiple actions (failover actions), each of which performs a step in failing-over the primary data set to the secondary data set. Thus, a complicated fault tolerance configuration, which covers multiple data sources and complex failover procedures, can be configured with data sets, DR policies and failover operations, and can be implemented by a DR management system running on a DR server.

When a disaster strikes and renders a primary data set of a network storage system unavailable, an administrator with access to the DR management system can initiate a predefined failover operation to fail-over the primary data set to a secondary data set of the network storage system. The failover operation is processed within the scope of a transaction (transactional processing). Transactional processing ensures that the failover operation is deemed successfully processed only when each and every one of the failover actions is successfully completed as a single unit, i.e., atomically. When error is detected in execution of any one of the failover actions, the transaction (failover operation) is deemed failed as a whole. When transactional processing a failover operation fails, the DR management system automatically aborts the failover operation, while providing options for rollback or move-forward of the failover process. During failover processing, status information is preserved for diagnosis and recovery purposes.

Transactional processing also utilizes locking for access control, in order to prevent a concurrent invocation of another instance of the same failover operation. A failover operation first requests a lock on a common piece of data, such as a database table or a row of data, before performing any of its failover actions. Thus, only one instance of the failover operation can obtain the lock and proceed at one time. In addition, transactional processing allows a failover operation to be invoked only when the internal state of the primary data set is in a "ready" state. The internal state of the primary data set is changed as soon as the failover operation is initiated. Afterward, even when the failover operation is unexpectedly terminated, the internal state of the primary data set is no longer in a "ready" state, and no more failover operations can be invoked on the primary data set. Thus, transactional processing ensures that a failover operation is executed in circumstances that would not cause adverse effects, thereby preserving the integrity of the network storage environment even in a chaotic situation.

Refer now to FIG. 1, which shows a network storage environment in which the present invention can be implemented. In FIG. 1, storage servers 140 and 150 manage multiple storage units 170 that include non-volatile mass storage devices (not shown). These storage servers provide storage services to a set of clients 110 through a network 130. The network 130 may be, for example, a local area network (LAN), wide area network (WAN), metropolitan area network (MAN), global area network such as the Internet, a Fibre Channel fabric, or any combination of such interconnects. Each of the clients 110 may be, for example, a conventional personal computer (PC), server-class computer, workstation, handheld computing or communication device, or the like.

Storage of data in the storage units 170 is managed by the storage servers 140 and 150. The storage servers 140 and 150 receive and respond to various read and write requests from the clients 110, directed to data stored in or to be stored in the storage units 170. The storage units 170 can include, for example, conventional magnetic or optical disks or tape drives; alternatively, they can include non-volatile solid-state memory, such as flash memory. The mass storage devices in storage units 170 can be organized as a Redundant Array of Inexpensive Disks/Devices (RAID), in which case the storage servers 140 and 150 access the storage units 170 using one or more well-known RAID protocols.

The storage server 140 or 150 can be a file-level server such as used in a NAS environment, a block-level storage server such as used in a SAN environment, or a storage server which is capable of providing both file-level and block-level service.

Further, although each of the storage servers 140 and 150 is illustrated as a single unit in FIG. 1, it can have a distributed architecture. For example, the storage server 140 or 150 can include a physically separate network module (e.g., "N-module") and disk module (e.g., "D-module") (not shown), which communicate with each other over an external interconnect.

In one embodiment, storage servers 140 and 150 are referred to as network storage subsystems. A network storage subsystem provides networked storage services for a specific application or purpose. Examples of such applications include database applications, web applications, Enterprise Resource Planning (ERP) applications, etc. Examples of such purposes include file archiving, backup, mirroring, etc. A network storage subsystem can also be implemented with a collection of networked resources provided by multiple storage servers and/or storage units.

In FIG. 1, a fault-tolerance configuration is implemented for providing uninterrupted data services to clients 110 even in disastrous situations. In one embodiment, the fault-tolerance configuration is implemented by a Disaster Recovery (DR) server 160. The fault-tolerance configuration utilizes a data redundancy setup. In FIG. 1, the redundancy is established by utilizing two storage servers 140 and 150, and by replicating data between the two storage servers through a data replication relationship 141. The data replication relationship 141 allows data stored in one storage server to be backed up or mirrored to the other storage server, thereby reducing the risk of data loss due to the failure of one storage server.

During normal operations, storage server 140 functions as a primary data source in providing data services to clients 110. Storage server 150 takes on a secondary, standby role, only to replicate data stored and/or updated in the primary storage server 140. Secondary storage server 150 does not provide direct data services to clients 110 in the absence of a failover situation. To further minimize the impact of a catastrophe, such as a natural disaster, it is advantageous to place storage servers 140 and 150 in two separate geographic locations. Although the secondary storage server 150 is not required to have an identical setup as the primary storage server 140, to ensure proper data replication, the second storage server 150 needs to have sufficient storage capacity to handle foreseeable data growth by the primary storage server 140.

In a disastrous situation, data services from the primary storage server 140 can be failed-over to the secondary storage server 150. "Failover" is the process of switching from a primary source to a redundant secondary data source upon the failure or abnormal termination of the primary data source. It provides an option to maintain availability and reliability of data services in a network storage environment. Failback, or giveback, is a reverse of the failover operation to restore the storage environment back to its original state before failover.

Upon completion of a failover operation, the secondary storage server 150 has taken over the role of the primary storage server 140 in serving clients 110. In one embodiment, once the primary storage server 140 becomes available again, newly updated data managed by the secondary storage server 150 is replicated back to primary storage server 140, and a failback operation can be performed to restore the data services back to the primary storage server 140. The failover and failback operations can be controlled by a DR management system on a Disaster Recovery (DR) server 160.

In FIG. 1, DR server 160 is connected to the network 130. The DR server 160 contains a DR management system 180 as a part of a fault-tolerance configuration. A Disaster Recovery (DR) client 120 is directly connected to the DR server 160 to access the DR management system 180. Clients 110 can also have similar access to the DR management system 180 via network 130. Alternatively, the DR server 160 can be directly connected to, or be implemented by, the storage servers 140 and 150. Such local configuration is advantageous when a disaster limits access via the network 130. Local configuration may require redundancy of the DR server 160 as well, so that there is no single point-of-failure in either the storage servers or the DR server level that would render the fault-tolerance configuration ineffective.

In one embodiment, the DR management system 180 contains components such as a data set support module 181 and a failover module 182. Data set support module 181 provides functions to create, update, and/or delete data sets. It is also responsible for defining and configuring DR policies and failover operations to be associated with data sets. Details of data sets, DR policies, and failover operations are described below. During failover processing, the failover module 182 can perform a transactional failover of the primary storage server 140 to the secondary storage server 150.

Figure 2:
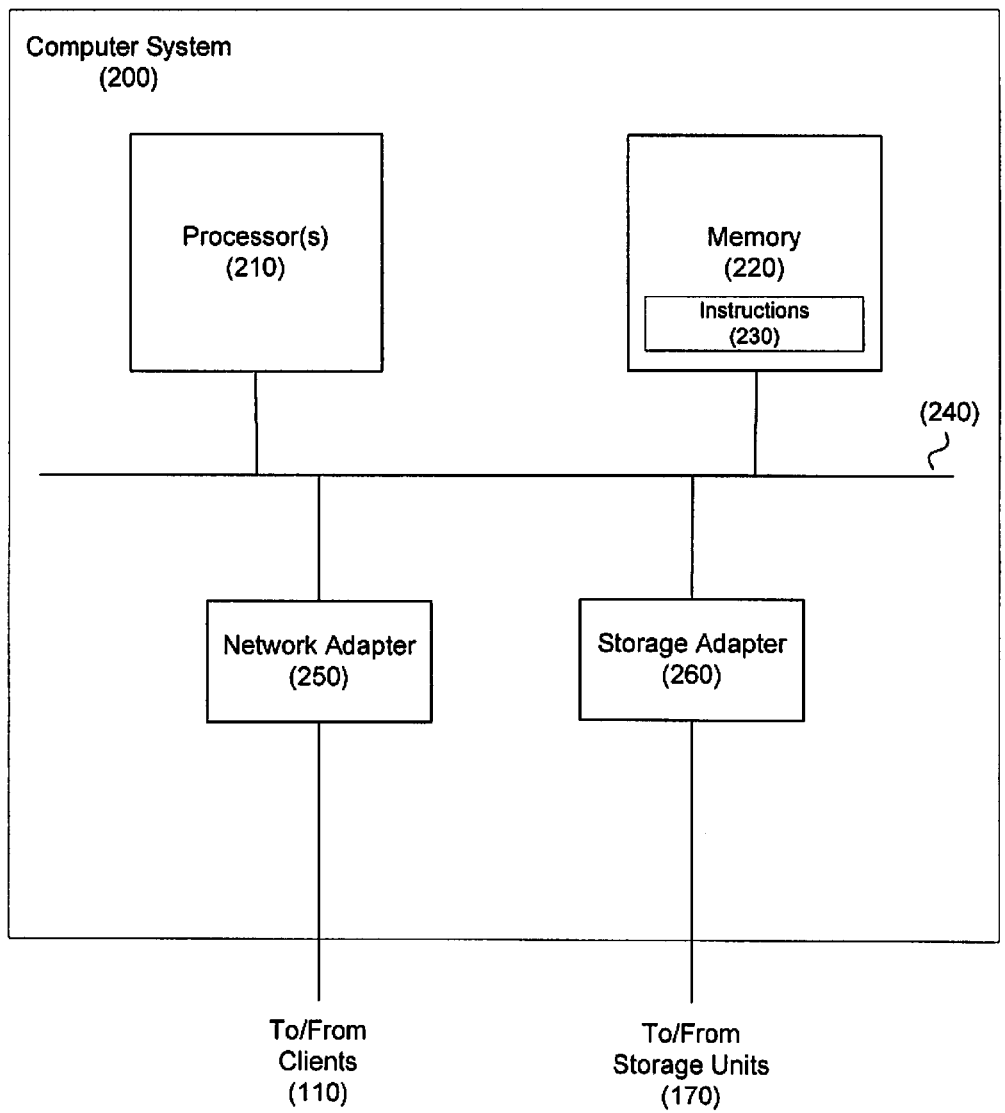
FIG. 2 is a high-level block diagram showing an example of the architecture of a storage server.

FIG. 2 is a high-level block diagram showing an example of the architecture for a computer system 200 that can be utilized to implement a primary storage server 140, a secondary storage server 150, or a DR server 160 of FIG. 1. In FIG. 2, the computer system 200 includes one or more processors 210 and memory 220 connected via an interconnect 240. The interconnect 240 is an abstraction that represents any one or more separate physical buses, point-to-point connections, or both connected by appropriate bridges, adapters, or controllers. The interconnect 240, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

The processor(s) 210 may include central processing units (CPUs) of the storage server 130 and, thus, control the overall operation of the storage server 130. In certain embodiments, the processor(s) 210 accomplish this by executing software or firmware stored in memory 220. The processor(s) 210 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 220 is or includes the main memory of the storage server 130. The memory 220 represents any form of random access memory (RAM), read-only memory (ROM), flash memory (as discussed above), or the like, or a combination of such devices. In use, the memory 220 may contain, among other things, a set of machine instructions 230 which, when executed by processor 210, causing the processor 210 to perform operations to implement embodiments of the present invention. In an embodiment in which a computer system 200 is implemented as a storage server, machine instructions 230 include an operating system for the storage server. When a computer system 200 is implemented as a DR server 160, the memory 220 includes machine instructions 230 for implementing a DR management system 180 as in FIG. 1.

Also connected to the processor(s) 210 through the interconnect 240 are a network adapter 250 and a storage adapter 260. The network adapter 250 provides the computer system 200 with the ability to communicate with remote devices, such as clients 110, over the network 130 of FIG. 1, and may be, for example, an Ethernet adapter or Fibre Channel adapter. In one embodiment, the network adapter 250 is connected to the network 130 of FIG. 1, to process DR messages sent from the DR server 160. The storage adapter 260 allows the computer system to access the storage units 170 and may be, for example, a Fibre Channel adapter or a SCSI adapter.

Figure 3:
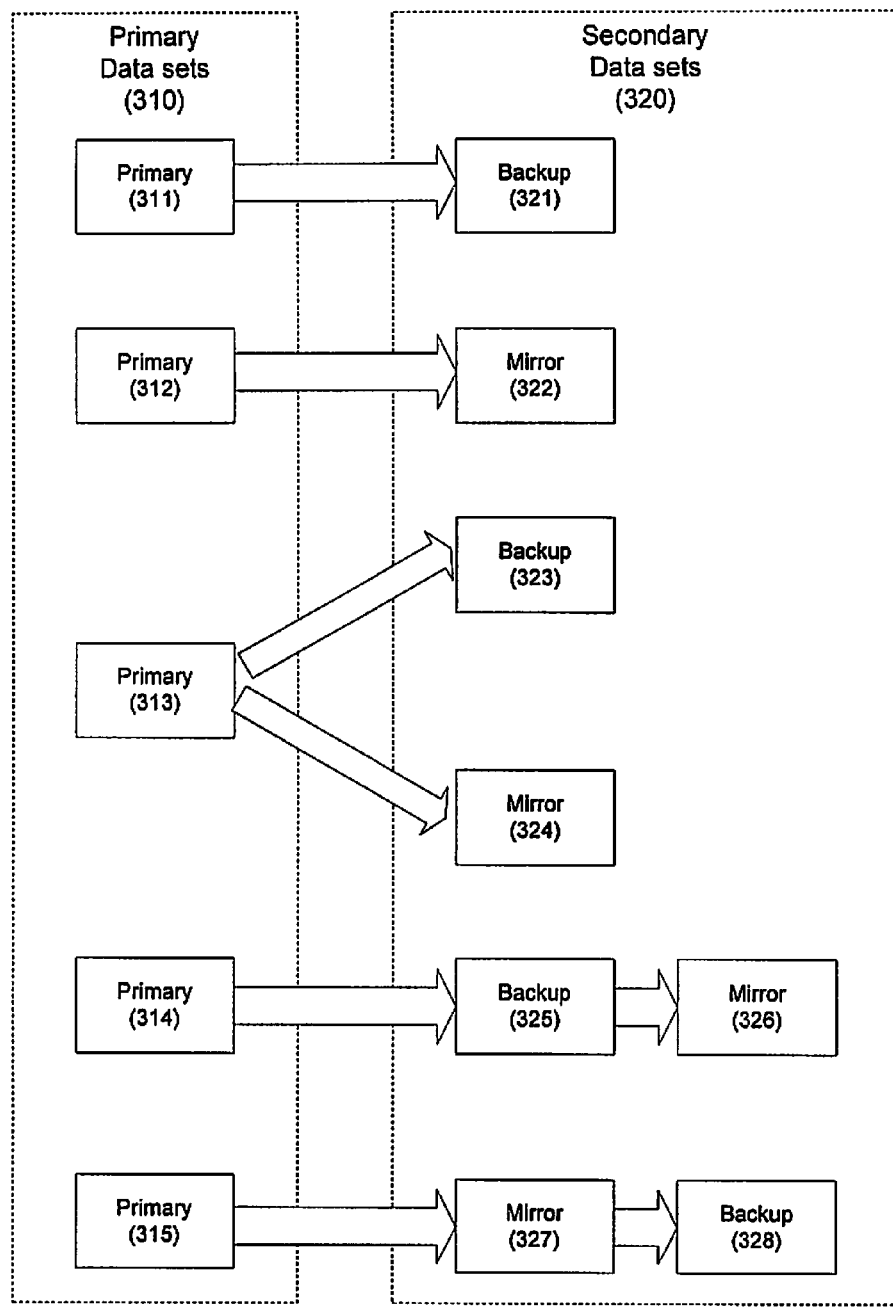
FIG. 3 illustrates various fault tolerance configurations.

FIG. 3 schematically illustrates various fault tolerance configurations, in accordance with certain embodiments of the present invention. A fault tolerance configuration can be implemented utilizing (1) multiple data sets, and (2) data replication. A data set organizes a set of storage objects into a logical unit, so that a data management policy, such as a DR policy, can be applied for uniform configuration and management of the storage objects. A storage object is a logical representation of a collection of data. Thus, a storage object can be, for example, a data block, a disk, a Logical Unit Number (LUN), a storage volume, or a storage server, etc. It can also represent a file, a directory, or any logical or physical storage structure that can be implemented by one or more storage units or storage servers in a network storage environment. A data set also contains multiple parameters for tracking the status of the data set in data processing. For example, to implement a fault tolerance configuration, a data set can utilize one of its internal parameters to track the status of a failover operation.

Data sets can be utilized to organize data stored in a network storage subsystem, or a network storage server. It can also be utilized to organize data for a specific business application or a specific purpose. For example, a database may use one storage object for storing database tables, and another storage object for storing transaction logs. A data set can then be defined to include these two storage objects for serving storage needs of the database. For a fault tolerance configuration, a primary data set can be created for providing active data services, and secondary data sets can be created to replicate data stored in the primary data set.

Data replication between the primary and secondary data sets can be implemented by backup and/or mirroring. Backup is the process of making a copy of data from an original data source, so that when data loss occurs, the copy may be used for retrieval of data and for restoring of the original data source. Similarly, mirroring is the process of duplicating data from the original data source. Updates to a primary data source are frequently and automatically reflected in its mirroring data source. In one implementation, a data update is deemed completed only upon the synchronous completion of updates in both the primary and the mirroring data sources. Alternative, a data update is first performed to the primary data source, and the second data source is asynchronously updated at a later time.

The differences between backup and mirroring can be in their invocation frequency. Backup may be performed hourly, daily, weekly, or in a longer interval, while mirroring may require synchronization immediately after data is updated in the primary data source. Backup may take a copy of the entire source, while mirroring sends only the updates to the mirror destination. Also, the differences between backup and mirroring can be in their implementations, which can have an implication in the actions that need to be performed during a failover operation. For example, when a mirroring relationship is implemented as a synchronous component of a data operation, special actions, such as turning off the mirroring function, etc, may be required to break such integral relationship. Further, backup can retain multiple copies of the historical data, while mirroring retains one or more real-time duplicates of the primary data source in its most up-to-date form.

In FIG. 3, for purpose of a fault tolerance configuration, primary data sets 310 are data sets created for active data services. Secondary data sets 320 are created for replication of the primary data sets 310. Different types of replication relationships are configured between the primary data sets 310 and the secondary data sets 320. In certain embodiments, primary data set 311 is backed up to a backup data set 321. Primary data set 312 is mirrored to a mirroring data set 322. Primary data set 313 is configured to include both a backup data set 323, and a mirroring data set 324. Primary data set 314 is first being backed up to a backup data set 325, and then the backup data set 325 is further mirrored to a mirroring data set 326. And primary data set 315 is being mirrored to a mirroring data set 327, which is itself being backed up to a backup data set 328. The above various examples of a fault tolerance configuration are each advantageous, because they provide flexibility in implementing the disaster recovery policy according to different storage needs. For example, when a primary data set 314 is failed over to a backup data set 325, because of the existence of a mirroring data set 326, a second failover operation could be performed on the backup data set 325. Thus, by utilizing multiple levels of replication, the risk of unexpected data loss is further diminished. The above configuration can be constructed by an administrator utilizing the DR management system of a DR server.

Once redundant data sets are configured, a DR policy can be applied to the data sets to manage failing-over of the data sets. DR policy is a data management policy, which can be created for uniform configuration and management of the storage objects contained in a data set. A DR policy includes a description of the desired behavior of the associated data set during disaster recovery. Attributes associated with a DR policy can be abstract at a high level, allowing implementation of underlying technology to evolve over time without requiring changes to the policy and its associated data sets. When a new member is added into a data set, the DR policy associated with the data set can be automatically extended to the new member without additional setup. Further, a set of operations can be specifically tailored to a DR policy, thereby providing a level of control over the associated data set and the set of operations. In one embodiment, a DR policy applied to any of the primary data sets 310 specifies a failover operation configured and ready to be performed on such data set. The configuration of a DR policy and application of the DR policy to a data set can be accomplished by an administrator utilizing a DR management system.

Figure 4:
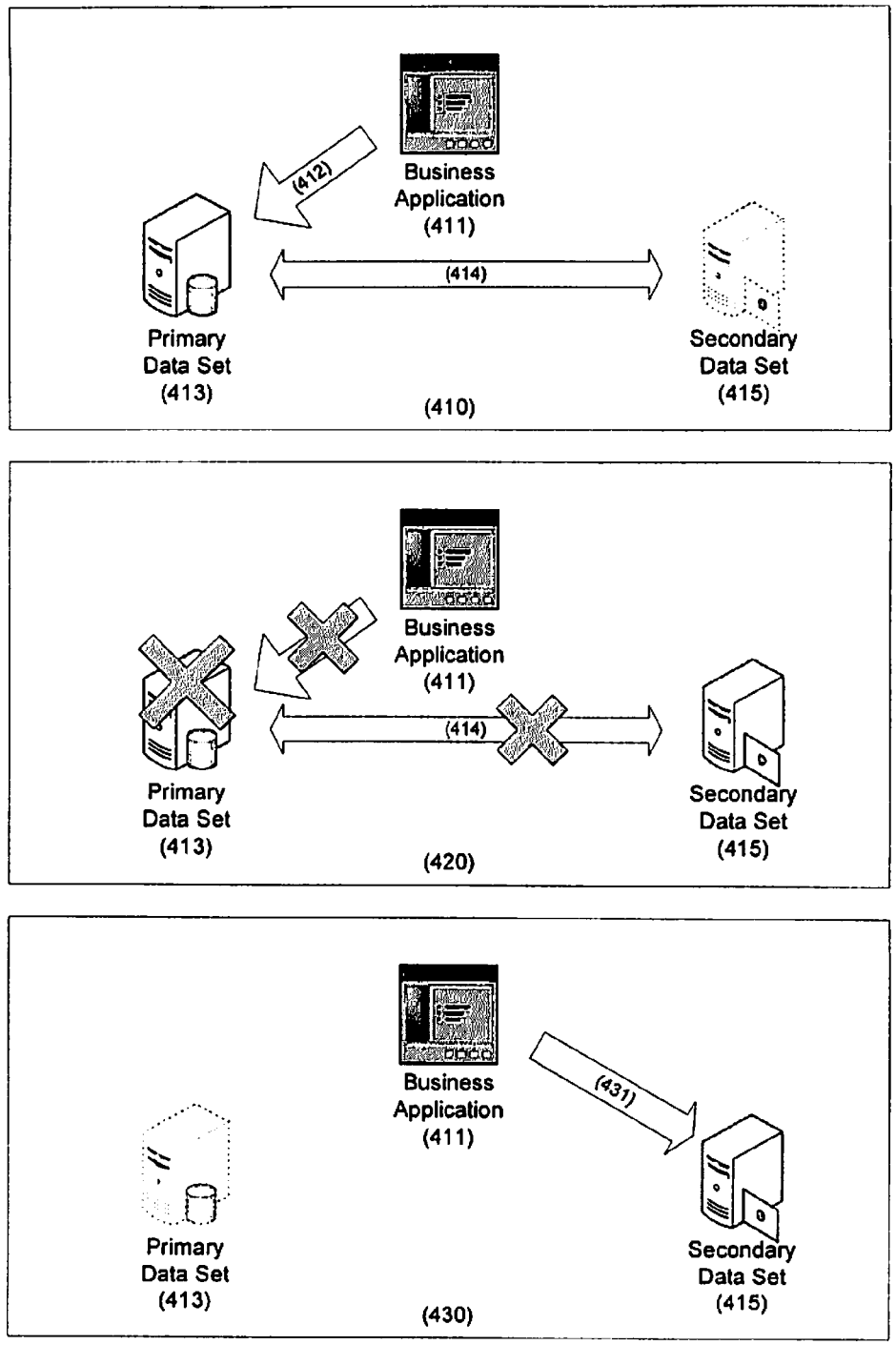
FIG. 4 illustrates a failover scenario that involves data sets.

FIG. 4 illustrates failover of a data set, according to certain embodiments of the present invention. As a part of fault tolerance configuration, failover enables the switching-over of data services from a primary data set to a secondary data set. In one embodiment, a failover process is controlled and performed by a DR management system. In scenario 410, during normal operation, a business application 411, such as an ERP application, is accessing a primary data set 413 via communication channel 412, while a replication relationship 414 is replicating data from the primary data set 413 to a secondary data set 415. The secondary data set 415 is inactive from the perspective of business application 411 (illustrated by the dotted outline of the secondary data set 415). The replication relationship 414 between the primary data set 413 and the secondary data set 415 can be any one of the various setups as illustrated in FIG. 3. In FIG. 4, a DR policy is applied to the primary data set 413. The DR policy defines a failover operation configured for failing-over the primary data set 413 to the secondary data set 415.

In scenario 420, data services from primary data set 413 are lost from the perspective of business application 411. The loss can be caused by hardware or software malfunctions at the primary data set 413, by loss of the communication channel 412 due to network outage, or by operator error that deletes or makes unavailable the primary data set 413, etc. The data services can also be interrupted by loss of electricity or natural disasters. Alternatively, primary data set 413 may remain functional from the perspective of business application 411, but an operational decision is made to perform a failover operation regardless. Thus, a sequence of failover actions are performed to switch over the data services from the primary data set 413 to the secondary data set 415.

To properly execute a failover operation, all necessary actions are planned out before the actual execution, and all resources required by the business application 411 are taken into consideration. For example, in many implementations, any process that is currently running against the primary data set 413 needs to be terminated; the replication relationship 414 needs to be examined to ensure that all data in the primary data set 413 are properly replicated to the secondary data set 415; and afterward, the replication relationship 414 needs to be broken so that data corruption is not propagated from the primary data set to the secondary data set.

In one embodiment, before the secondary data set 415 is deemed ready for use, additional configurations are applied to activate the secondary data set. Examples of activating the secondary data set include: exporting of all storage units; configuring of data access protocols (e.g., NFS, CIFS, FCP, or iSCSI); starting up of data service related processes; and/or setting up of access authorizations, etc. Scenario 420 of FIG. 4 illustrates an overview of the network storage environment in which the secondary data set 415 is ready to provide data service (shown by the solid outline), and the replication relationship 414 is broken. Afterward, the business application 411 is pointed to the secondary data set 415 to resume its operation, as illustrated by data request 431 of scenario 430. Only upon the completion of all of the above failover actions without error can a failover operation be deemed successful. If any one of the above actions fails, exposing the secondary data set 415 to the business application 411 could cause data corruption or other irreversible damage. Therefore, a properly configured and properly executed failover operation is critical to fault tolerance.

Figure 5:
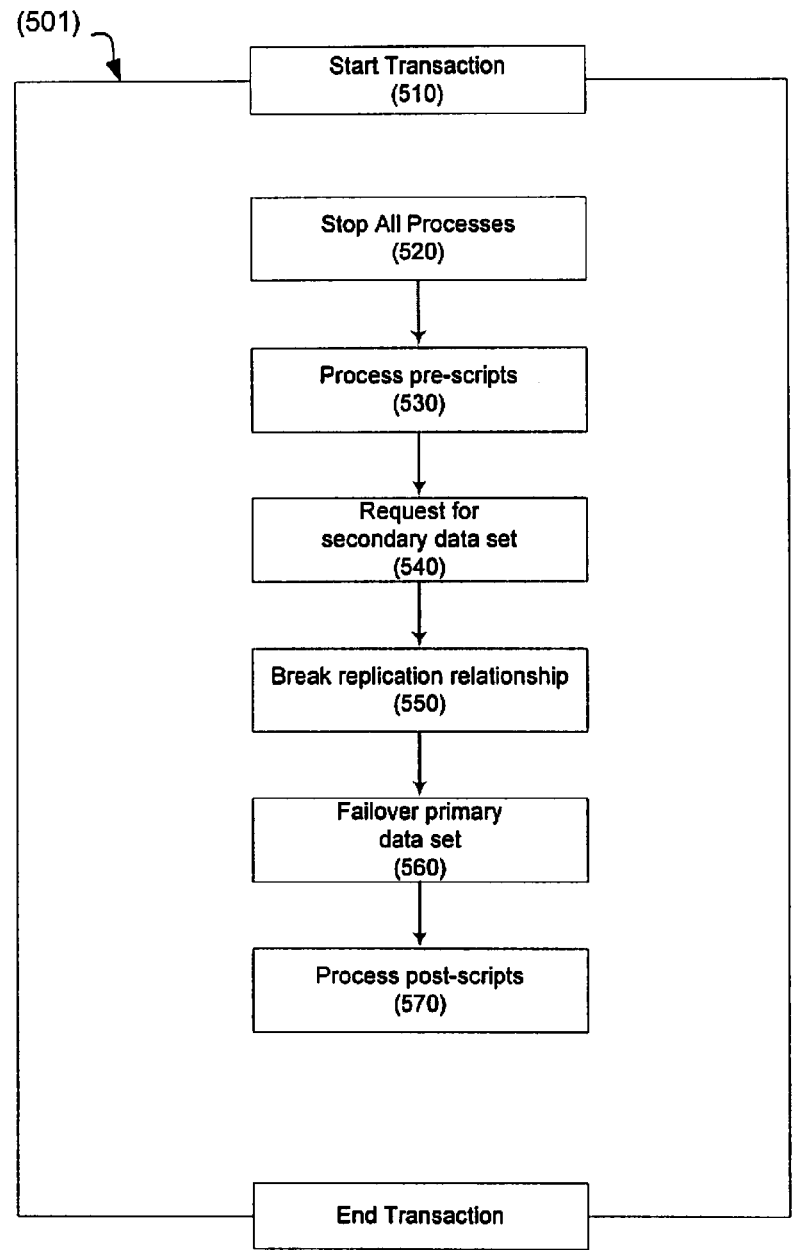
FIG. 5 illustrates transactional processing of a failover operation.

FIG. 5 schematically illustrates a failover operation suitable for transactional processing, according to certain embodiments of the present invention. The failover operation 501 can be set up and performed by a DR management system 180 of FIG. 1. In FIG. 5, a set of failover actions 520-560 for a specific primary data set is created, so that when a disastrous situation arises, these failover actions can be performed in the order and manner as configured for failover of the specific primary data set. Such an approach is advantageous, because it allows the failover operation 501 to be planned and tested out, before being hastily executed in a chaotic emergency situation. Also, a pre-defined failover operation systematically records the repeatable pattern of all of the failover actions that need to be performed, thereby eliminating the possibility of missing certain essential steps due to human error in the midst of a disaster recovery. Alternatively, each of the failover actions includes dependencies on other failover actions, so that a correct order of execution can be predetermined based on these dependencies. Thus, the failover actions 520-560 may or may not be sequentially processed.

In one embodiment, a test function is also available for a failover operation. The test function does not perform any real failover of the primary data set. Instead, it is able to test-run each of the failover actions, so that any potential bugs can be found and fixed before a real disaster recovery occurs. During testing, certain failover actions can be skipped or ignored, so that the test can be initiated even on a "live", production data set. Status of each failover action is recorded, so that a user may evaluate the outcomes to fix or fine-tune each of the failover actions.

In one embodiment, the failover operation 501 is transactionally processed, i.e., performed under a transaction scope 510. Transactional processing utilizes various controlling mechanisms to aid the execution of all actions participating in a transaction. First, transactional processing ensures that all actions 520-560 of the failover operation 501 are either successfully completed as a single unit, i.e., atomically, or the transaction 510 fails as a whole. Secondly, transactional processing enforces a single thread of execution in an environment where there can be multiple invocations of the same failover operation. Lastly, transactional processing provides mechanisms to recover from a failure during the execution of the participating actions, or from a premature termination of the failover operation.

In one embodiment, a DR management system processes a failover operation under the transaction scope 510, to ensure that either all of the actions 520-560 are completed or none of the actions is performed. Such an all-or-nothing feature is commonly referred to as atomicity. If any one of the actions 520-560 returns an error status, the failover operation 501 is immediately aborted. An administrator who invoked a failover operation can also abort the failover operation. Aborting the failover operation allows an administrator to diagnose the error before continuing processing the rest of the actions. Alternatively, a rollback action is defined for each failover action, so that when the DR management system detects error from one of the failover actions, the DR management system invokes the rollback actions to revert the data set back to its original condition before the failover operation. Thus, with the abort and rollback mechanisms, a DR management system is able to implement an all-or-nothing transactional processing of a failover operation.

Transactional processing also enforces a concurrency control during the processing of a failover operation. Since multiple users can have access to the DR management system 180 of FIG. 1, and can have the privilege to invoke a failover operation, transactional processing allows only a single thread of access to invoke the failover operation. This prevents multiple instances of the same failover operation from being invoked around the same time, which can potentially cause confusion and unpredictable consequences during failover.

In one embodiment, a lock is implemented to enforce the single thread of invocation of the failover operation. Locking is a common concurrent control mechanism to enforce one access at a time to a resource. When multiple processes are competing for one resource, each process is asked to obtain a lock first. The first process to obtain the lock is the one granted access to the resource. In one embodiment, locking can be implemented with database locking supported by a Database Management System (DBMS), such as Oracle® Database, or Microsoft® SQL Server®. As soon as the failover operation 501 is invoked, the DR management system first invokes a DBMS call to obtain an exclusive update lock on a predetermined piece of data, such as a table, or a row of a table, etc. Afterward, if there are multiple processes attempting the same failover operation, the process that is successful in obtaining the database lock is the one allowed to perform the failover actions 511-516. Therefore, a transaction scope 510 utilizing a locking mechanism can prevent multiple instances of the same failover operations from being performed at the same time, thus ensuring single invocation of failover operation.

After a lock is obtained at transaction scope 510, the failover actions 520-560 are executed in a predetermined order. Failover action 520 stops all data servicing processes on the primary data set if the data set is still accessible. Action 530 executes optional pre-failover scripts, thus allowing users to predefine and add customized processing before actual failover. The script might, for example, alert an administrator that a failover is in process, or perform actions that are specific to certain storage objects in the data set. Action 540 requests the secondary data set to be ready for data services, which includes the quiescing of the data sets. Quiescence pauses or alters all processing in order to guarantee a consistent and usable data set. Action 550 breaks the mirroring or backup replication relationship between the primary and secondary data sets, after the data sets have been deemed consistent. Afterward, action 560 terminates data services on the primary data set, and activates all data services on the secondary data set. And finally, action 570 performs optional post-failover scripts, which contain another set of customized actions, such as success notification, or starting up of the applications. Note that the above failover operation 501 is only one of many possible configurations.

Even with the use of abort and/or rollback, a failover operation may still prematurely fail due to unanticipated errors, or due to disastrous events such as power outages, before having a chance to abort or rollback. Further, locking would not prevent a second instance of the failover operation from being invoked after the first instance is prematurely terminated. Therefore, additional mechanisms can be used to ensure that the failover operation cannot be invoked again under these exceptional situations without a proper evaluation and diagnosis.

Figure 6:
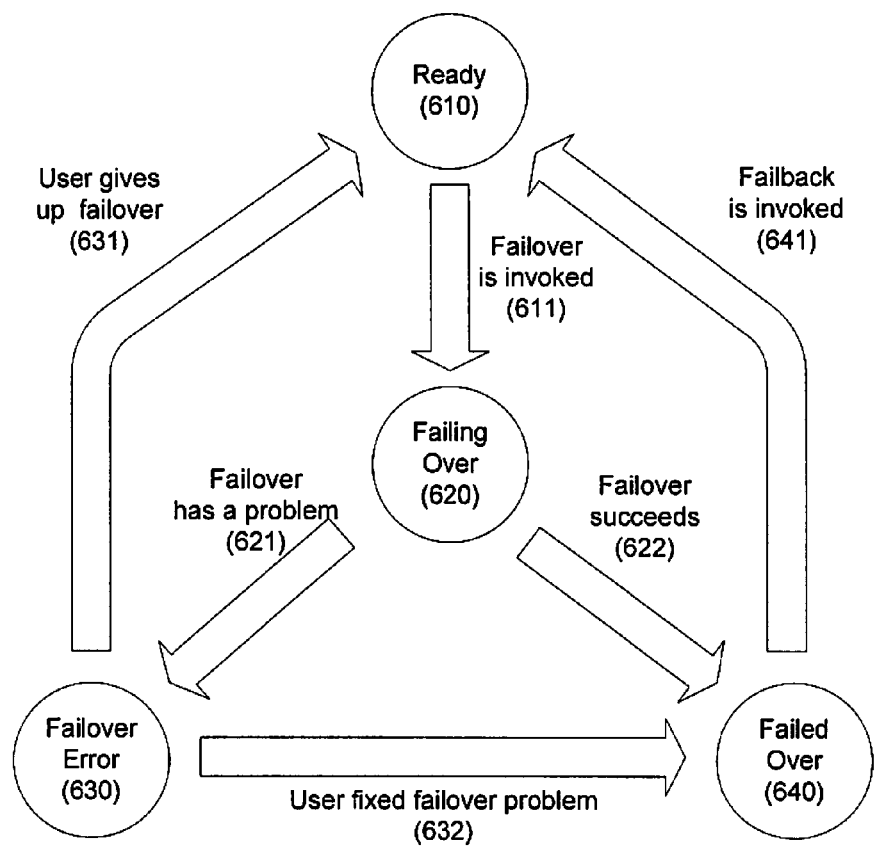
FIG. 6 illustrates a state transition diagram associated with failover.

FIG. 6 is a state diagram showing states and transitions that can be enforced for a DR enabled data set, in accordance with certain embodiments of the present invention. By placing a data set in a proper state, a DR management system is able to recover from an interruption in a failover process. An internal parameter of a data set can be utilized for storing the state of the data set, so that the readiness and status of the data set can be determined. In FIG. 6, states of a data set are represented by circles. The arrows between different states represent possible transitions that can be performed on the data set, and the states resulting from these transitions. Thus, each arrow indicates change of a data set's internal state from the original state the arrow is pointing from, to the transitioned state the arrow is pointing to. In FIG. 6, states 610, 620, 630 and 640 are some possible internal states for a DR policy enabled data set. Functions available for the data set depend on which specific internal state the data set is in. In one embodiment, when in state 610, a data set is ready to be failed over. In state 620, the data set is in the middle of a failover operation, which is neither failed nor completed. In state 630, the data set is successfully failed over. And in state 640, the data set indicates an error is detected from a failover operation.

In one embodiment, during normal operation, the data set is initially assigned to a "ready" state 610, and a failover operation can be initiated only when the data set is in such a state. Upon invocation of a failover operation by an administrator during failover, a state transition 611 occurs and the internal state of the data set is changed from "ready" state 611 to "failing over" state 620. The state transition 611 is performed within the scope of a transaction (e.g., after a mutual exclusive lock has been obtained, etc.), so that a roll-back of the transaction would also roll-back the change to the internal state without the possibility of interference by other, concurrent failover operations. If the failover operation completes all of its failover actions without any error, the failover operation is considered a success, and the internal state of the data set is transitioned to "failed-over" state 640 via transition 622. A "failed-over" state gives the user assurance that the failover operation is complete, and the failed over data set is ready for use. Once a data set is in a "failed over" state, a failback, or giveback, operation becomes available, so that the secondary data set may be failed-back 641 to the primary data set.

In one embodiment, when the failover operation returns an error during processing of the data set with a "failing over" state 620, the DR management system immediately aborts the failover operation, so that no further failover actions are performed. Also, the internal state of the data set is switched via the state transition 621 to "failover error" state 630. In a "failover error" state 630, any attempt to restart the failover operation is not allowed. Users are given the options of either manually fixing the problems to finish the failover operation through transition 632, or manually fixing the problems to rollback the failover operation to its original "ready" state via transition 631. This approach is advantageous, because it gives the user a clear indication of the current state of a failover operation. It prevents other attempts at restarting the failover operation without knowing the consequences of such actions. Further, it leaves options to manually rollback or move-forward the failover operation.

In one embodiment, the internal state of a data set is continually and persistently saved in a non-volatile memory, so that the value of the state is preserved even during power outages. By utilizing persistent internal state information, the exact condition of a data set during an unfinished failover operation can be determined, even after a complete system restart. Further, by limiting a failover operation to data sets in "ready" state, no accidental starting of a second instance of the failover operation is allowed when a first instance is prematurely terminated. The DR management system is therefore able to maintain the integrity of a data set, even when it didn't have a change to abort or rollback. Such approach is advantageous because it minimizes the possibility of confusion during a failover operation on a data set that either is in the process of failing over, or received an error during a previous failover operation.

Figure 7:
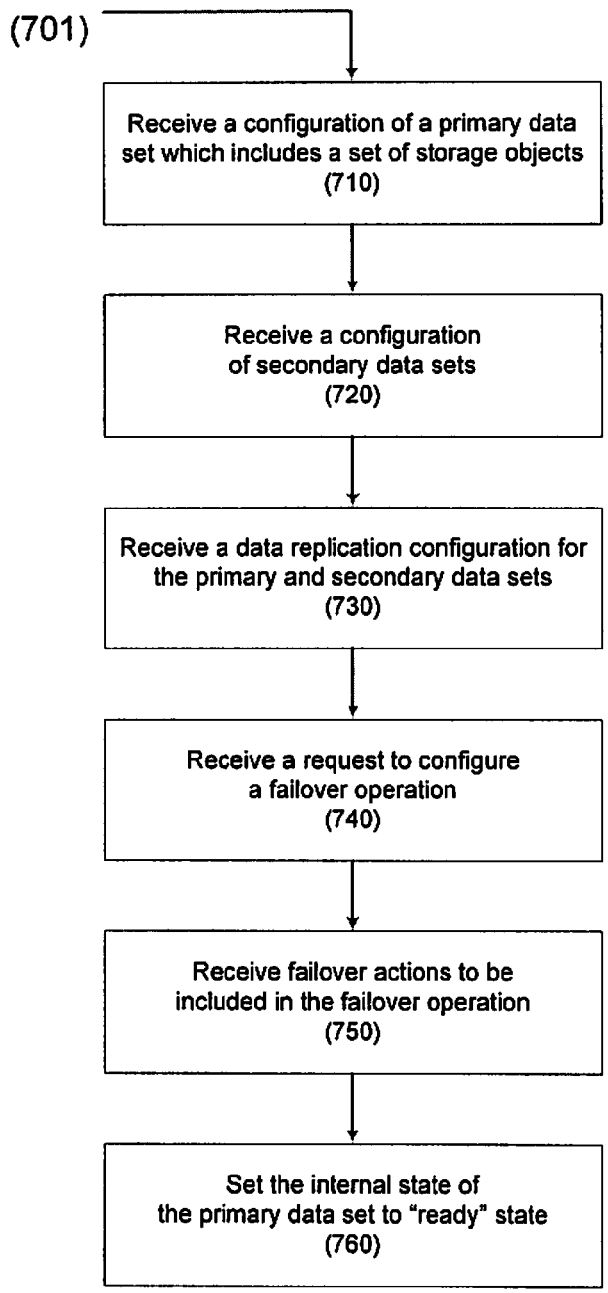
FIG. 7 is a flow diagram showing a process in a computer system for setting up a fault tolerance configuration.

FIG. 7 illustrates a flow diagram of a process 701 for implementing a fault tolerance configuration, in accordance with one embodiment of the present invention. The process 701 can be performed by processing logic that may comprise hardware (e.g., special-purpose circuitry, dedicated hardware logic, programmable hardware logic, etc.), software (such as instructions that can be executed on a processing device), firmware or a combination thereof. In one embodiment, process 701 is executable by the processor 210 of FIG. 2, installed in a DR server 160 of FIG. 1.

Referring back to FIG. 7, process 701 can be initiated by an administrator to set up a fault tolerance configuration for a network storage environment. At 710, a DR management system receives a configuration from the administrator to create a primary data set. The configuration contains a set of storage objects to be included into the primary data set. At 720, the DR management system receives a similar configuration to create secondary data sets for replicating data stored in the primary data set. At 730, data replication is configured for the primary and secondary data sets. The replication may be implemented by backing up or mirroring of the primary data set. At 740, a DR policy is applied to the primary data set, so that a failover operation can be created via the DR management system for the failover of the data sets. At 750, a failover operation is configured with multiple failover actions. Examples of failover actions are illustrated in FIG. 5. Afterward, at 760, the internal state of the primary data set is set to "ready," and the fault tolerance configuration is completed. During normal operations, the primary data set provides data services, while the secondary data sets maintain a replication relationship with the primary data set.

Figure 8:
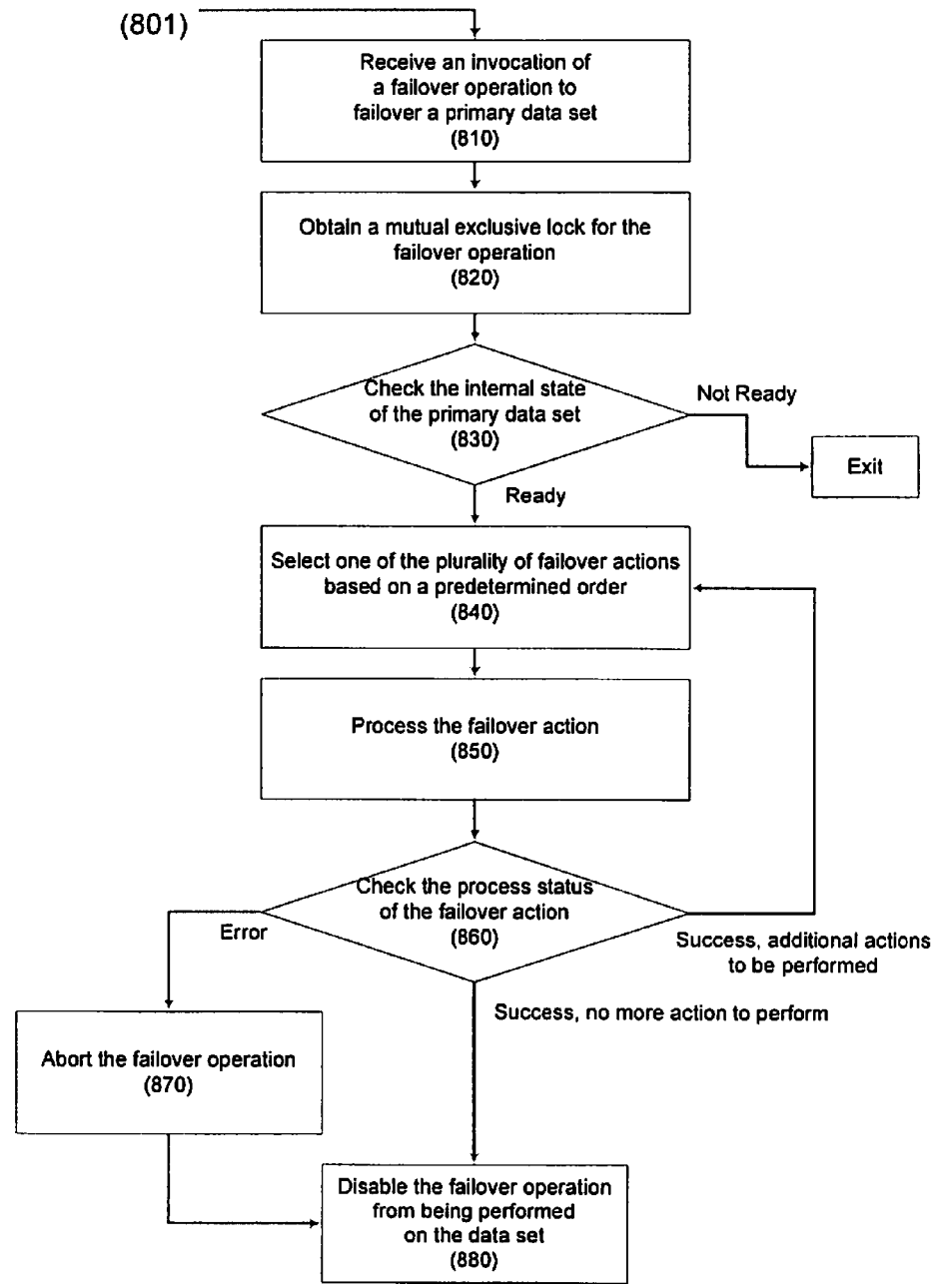
FIG. 8 is a flow diagram showing a process in a computer system for transactionally failing-over a data set.

FIG. 8 illustrates a flow diagram of a process 801 for failing over a data set, in accordance with one embodiment of the present invention. The process 801 can be performed by processing logic that may comprise hardware (e.g., special-purpose circuitry, dedicated hardware logic, programmable hardware logic, etc.), software (such as instructions that can be executed on a processing device), firmware or a combination thereof. In one embodiment, process 801 is executable by the processor 210 of FIG. 2, installed in a DR server 160 of FIG. 1.

Referring back to FIG. 8, an administrator initiates process 801 via a DR management system to fail-over a primary data set. At 810, an invocation of a pre-defined failover operation for the primary data set is received by the DR management system. At 820, a mutual exclusive lock is obtained by the DR management system for the failover operation. As soon as the lock is obtained, at 830, the internal state of the primary data set is checked. If the internal state is in "ready," the internal state of the primary data set is persistently changed from "ready" to "failing-over," and process 801 proceeds to 840. If the internal state is not in "ready," which means the failover operation has been previously invoked on the primary data set, the process 801 is not allowed to continue processing, and is therefore terminated. Therefore, even if the failover operation is abnormally terminated, the option to start another instance of the failover operation would not be available, since the internal state of the primary data set is no longer in the "ready" state.

Each of the failover actions predefined in the failover operation is selected at 840 based on a predetermined order. Afterward, the selected failover action is performed at 850. The outcome of the failover action performance is evaluated at 860. If the failover action is performed successfully, and there are additional actions to be performed, process 801 proceeds to 840, for the selection of the next failover action. If there are no more failover actions to be performed, process 801 proceeds to 880, in which the internal state of the primary data set is changed from "failing-over" to "failed-over," to clearly indicate the status of the failover operation. In this case, the failover operation is considered a success. Further, data services can be resumed on the failed-over secondary data set. Since the internal state of the primary data set is not in "ready," no further instance of the failover operation can be invoked on the primary data set. Thus, the failover operation is disabled at 880 with respect to the primary data set.

If the determination at 860 returns error, process 801 immediately aborts the failover operation at 870, and changes the internal state of the primary data set to "failover error." In addition, status information is recorded for the failed failover action, so that manual rollback or move-forward can be performed depending on the error status of the failover action. Once the failover action is aborted, process 801 proceeds to 880, where the failover operation is also disabled in order to prevent accidental invocation.

Thus, methods and systems for transactional failover of data sets have been described. The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
replicating a primary data set stored in a first storage unit of a network storage system to a secondary data set stored in a second storage unit of the network storage system, wherein the primary data set and the secondary data set include data associated with data services provided to clients by a primary storage server and a secondary storage server, respectively, of the network storage system;
receiving a signal to failover the primary data set to the secondary data set;
identifying a predefined failover operation created specifically for the primary data set based on a disaster recovery (DR) policy, wherein the predefined failover operation includes multiple failover actions to failover the primary data set to the secondary data set including stopping execution of the data services on the primary data set, processing a failover script that has been predefined by a user, requesting the secondary data set to be in a ready state for the data services, breaking the replication relationship between the primary data set and the secondary data set, and activating the data services on the secondary data set;
continuously maintaining a state of the primary data set during the failover using an internal parameter of the primary data set, wherein the state of the primary data set indicates a status of the predefined failover; and
performing the predefined failover operation to failover the primary data set to the secondary data set in an event the state of the primary data set is in a ready state, wherein performing the predefined operation includes executing the failover actions when the predefined failover operation is invoked, and wherein in an event that any one of the failover actions fails to complete successfully, the state of the primary data set is set to a failover error state, the predefined failover operation is aborted, and the primary data set and the secondary data set are reverted to conditions of the primary data set and the secondary data set, respectively, prior to the performance of the predefined operation.

2. The method of claim 1, further comprising:
aborting the predefined failover operation upon detecting an error from one of the failover actions.

3. The method of claim 1, further comprising:
disallowing multiple instances of the predefined failover operation from being performed upon initiation of the predefined operation.

4. The method of claim 1, further comprising:
preventing multiple instances of the predefined failover operation from being concurrently performed.

5. The method of claim 1, wherein the failover actions are executed in a predetermined order.

6. The method of claim 1, further comprising:
providing a failback operation upon a successful completion of the predefined operation.

7. The method of claim 1, wherein one of the failover actions breaks the data replication relationship.

8. The method of claim 1, further comprising:
tracking a status of the failover operation using an internal parameter of the primary data set or an internal parameter of the secondary data set.

9. The method of claim 1, wherein at least one of the failover actions is performed based on a data replication relationship between the primary data set and the secondary data set.

10. A method comprising:
receiving, at a disaster recovery (DR) management system, DR configuration information indicating a configuration of a primary data set, a configuration of a secondary data set, and a configuration of a data replication relationship between the primary data set and the secondary data set;
receiving, at the DR management system, a request to create a specific predefined failover operation for the primary data set that includes multiple failover actions to be executed for switching a source of data for data services provided to clients from the primary data set to the secondary data set, wherein the failover actions include stopping execution of the data services on the primary data set, processing a failover script that has been predefined by a user, requesting the secondary data set to be in a ready state for the data services, breaking the replication relationship between the primary data set and the secondary data set, and activating the data services on the secondary data set;
in response to the request, configuring the failover operation at the DR system such that when the failover operation is subsequently invoked to failover the primary data set to the secondary data set in an event the state of the primary data set is in-a ready state, the predefined failover actions are executed, wherein in an event any one of the failover actions fails to complete successfully, the state of the primary data set is set to a failover error state, the failover operation is aborted, and the primary data set and the secondary data set are reverted to states of the primary data set and the secondary data set, respectively, existing prior to the execution of the failover actions, and wherein the state of the primary data set is continuously maintained during the failover using an internal parameter of the primary data set, the state of the primary data set indicating the status of the predefined failover.

11. The method of claim 10, further comprising:
aborting the failover operation upon detecting an error from one of the failover actions.

12. The method of claim 10, further comprising:
disallowing multiple instances of the failover operation from being performed upon initiation of the failover operation.

13. The method of claim 10, further comprising:
preventing multiple instances of the failover operation from being concurrently performed.

14. The method of claim 10, further comprising:
test-executing the failover operation without failing over the primary data set to the secondary data set.

15. The method of claim 10, wherein one of the failover actions breaks the data replication relationship.

16. A method comprising:
receiving a signal to failover a primary data set to a secondary data set;
continuously maintaining a state of the primary data set using an internal parameter of the primary data set, wherein the state of the primary data set indicates a status of a predefined failover operation;
initiating the failover operation to failover the primary data set to the secondary data set, wherein the failover operation includes multiple predefined failover actions, the failover actions including stopping execution of the data services on the primary data set, processing a failover script that has been predefined by a user, requesting the secondary data set to be in a ready state for the data services, breaking the replication relationship between the primary data set and the secondary data set, and activating the data services on the secondary data set, and wherein the primary data set has a data replication relationship with the secondary data set, and the primary data set and the secondary data set include data associated with data services provided to clients by a primary storage server and a secondary storage server, respectively, of a network storage system;
obtaining a lock for the failover operation in an event a state of the primary data set indicates a ready state, to prevent another instance of the failover operation from being invoked;
executing the failover actions as a single transaction such that in an event that any one of the failover actions fails to complete successfully, the state of the primary data set is set to a failover error state, the failover operation is aborted, and the primary data set and the secondary data set are reverted to states of the primary data set and the secondary data set, respectively, existing prior to the execution of the failover actions;
tracking a status of the failover fail-over operation using an internal parameter of the primary data set or an internal parameter of the secondary data set;
executing a rollback action to revert the data sets to original conditions existing before the execution of the plurality of failover actions; and
disallowing the failover operation from being performed on the primary data set upon the initiation of the failover operation.

17. The method of claim 16, further comprising:
aborting the failover operation upon detecting an error from one of the failover actions.

18. The method of claim 16, further comprising:
preventing multiple instances of the failover operation from being concurrently performed.

19. A system comprising:
a processor;
a network interface through which to communicate with a primary network storage subsystem and a secondary network storage subsystem; and
a memory coupled with the processor, the memory storing instructions which, when executed by the processor, cause the system to:
receive a disaster recovery (DR) configuration, wherein the DR configuration specifies the primary network storage subsystem, the secondary network storage subsystem and a data replication relationship between the primary network storage subsystem and the secondary network storage subsystem;
receive a request to create a specific failover operation for the primary network storage subsystem that includes multiple predefined failover actions to be executed for switching client data services from the primary network storage subsystem to the secondary network storage subsystem, wherein the failover actions include stopping execution of the data services on the primary data set, processing a failover script that has been predefined by a user, requesting the secondary data set to be in a ready state for the data services, breaking the replication relationship between the primary data set and the secondary data set, and activating the data services on the secondary data set;
in response to the request, configure the failover operation at the DR system, wherein when the failover operation is subsequently executed in an event a state of the primary data is in a ready state, the failover actions are executed such that, in an event any one of the failover actions fails to complete successfully, the state of the primary data set is set to a failover error state, the failover operation is aborted, and the primary network storage subsystem and the secondary network storage subsystem are each reverted to states existing prior to the execution of the failover actions, and wherein the state of the primary data set is continuously maintained during the failover using an internal parameter of the primary data set, the state of the primary data set indicating the status of the predefined failover.

20. The system of claim 19, the process further comprising:
aborting the failover operation upon detecting an error from one of the failover actions.

21. The system of claim 19, the process further comprising:
disallowing multiple instances of the failover operation from being performed upon initiation of the failover operation.

22. The system of claim 19, the process further comprising:
preventing multiple instances of the failover operation from being concurrently performed.

* * * * *